United States Patent
Parsons et al.

(10) Patent No.: US 11,082,304 B2
(45) Date of Patent: Aug. 3, 2021

(54) METHODS, SYSTEMS, AND COMPUTER READABLE MEDIA FOR PROVIDING A MULTI-TENANT SOFTWARE-DEFINED WIDE AREA NETWORK (SD-WAN) NODE

(71) Applicant: Oracle International Corporation, Redwood Shores, CA (US)

(72) Inventors: Christopher Wayne Parsons, Apex, NC (US); Sonia Kiang Rovner, Chapel Hill, NC (US); Robert Joseph Harned, Cary, NC (US); Raymond Lindsey Tims, Morrisville, NC (US)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 126 days.

(21) Appl. No.: 16/586,300

(22) Filed: Sep. 27, 2019

(65) Prior Publication Data

US 2021/0099360 A1    Apr. 1, 2021

(51) Int. Cl.
*H04L 12/24* (2006.01)
*H04L 12/46* (2006.01)
(Continued)

(52) U.S. Cl.
CPC .......... *H04L 41/50* (2013.01); *H04L 12/4633* (2013.01); *H04L 41/28* (2013.01);
(Continued)

(58) Field of Classification Search
None
See application file for complete search history.

(56) References Cited

U.S. PATENT DOCUMENTS 8,125,907 B2    2/2012   Averi et al.
8,274,891 B2    9/2012   Averi et al.
(Continued)

FOREIGN PATENT DOCUMENTS

WO    WO-2018/042459 A1    3/2018

OTHER PUBLICATIONS

Notice of Allowance and Fee(s) Due and Examiner-Initiated Interview Summary for U.S. Appl. No. 15/409,019 (dated Jun. 4, 2019).
(Continued)

*Primary Examiner* — Ranodhi Serrao
(74) *Attorney, Agent, or Firm* — Jenkins, Wilson, Taylor & Hunt, P.A.

(57) ABSTRACT

One method occurs at a first network node in a service provider network for providing at least one service to multiple tenants. The method includes generating, using input from an administrator of the service provider network, user configuration information for a first tenant; sending, to the first tenant, at least some of the user configuration information; receiving, from the first tenant, first configuration information for configuring a first conduit for tunneling communications between the service provider network and a first site associated with the first tenant's SD-WAN; configuring, using the first configuration information, the first conduit, wherein the first network node is associated with a plurality of conduits, wherein a second conduit of the plurality of conduits is at least in part configured by a second tenant and not the first tenant; and tunneling, via the first conduit, communications between the service provider network and the first site.

20 Claims, 10 Drawing Sheets

(51) Int. Cl.
*H04L 29/06* (2006.01)
*H04L 12/715* (2013.01)
*H04L 12/725* (2013.01)

(52) U.S. Cl.
CPC .......... *H04L 45/64* (2013.01); *H04L 63/0428* (2013.01); *H04L 45/306* (2013.01)

(56) References Cited

U.S. PATENT DOCUMENTS

| | | | |
|---|---|---|---|
| 8,452,846 B2 | 5/2013 | Fredette et al. | |
| 9,069,727 B2 | 6/2015 | Martin et al. | |
| 9,100,338 B2 | 8/2015 | Averi et al. | |
| 9,392,061 B2 | 7/2016 | Fredette et al. | |
| 9,407,557 B2 | 8/2016 | Wadkins et al. | |
| 9,560,142 B2* | 1/2017 | Sama | H04L 49/15 |
| 9,634,893 B2* | 4/2017 | Boutros | H04L 41/12 |
| 9,906,402 B2* | 2/2018 | Ramachandran | H04L 43/065 |
| 10,015,097 B2* | 7/2018 | Herrero | H04L 65/80 |
| 10,015,287 B2* | 7/2018 | Herrero | H04L 69/10 |
| 10,447,543 B2 | 10/2019 | Rovner et al. | |
| 10,608,985 B2* | 3/2020 | Herrero | H04L 12/4633 |
| 2002/0027885 A1 | 3/2002 | Ben-Ami | |
| 2006/0239271 A1 | 10/2006 | Khasnabish et al. | |
| 2007/0248077 A1 | 10/2007 | Mahle, Jr. et al. | |
| 2013/0077701 A1 | 3/2013 | Tsien et al. | |
| 2015/0071067 A1 | 3/2015 | Martin et al. | |
| 2016/0036921 A1* | 2/2016 | Sama | H04L 67/10 726/4 |
| 2016/0072706 A1 | 3/2016 | Huang et al. | |
| 2016/0080195 A1* | 3/2016 | Ramachandran | H04L 45/38 370/220 |
| 2016/0164750 A1 | 6/2016 | Holkkola | |
| 2016/0179850 A1 | 6/2016 | Martin et al. | |
| 2016/0182305 A1 | 6/2016 | Martin et al. | |
| 2016/0182319 A1 | 6/2016 | Martin et al. | |
| 2016/0182327 A1 | 6/2016 | Coleman, Jr. et al. | |
| 2016/0197802 A1 | 7/2016 | Schultz et al. | |
| 2016/0315808 A1 | 10/2016 | Saavedra | |
| 2016/0345341 A1 | 11/2016 | Oliver et al. | |
| 2017/0026233 A1* | 1/2017 | Boutros | H04L 41/12 |
| 2017/0026280 A1 | 1/2017 | Yu et al. | |
| 2017/0055133 A1 | 2/2017 | Dieselberg et al. | |
| 2017/0118217 A1* | 4/2017 | Sama | H04L 67/141 |
| 2017/0207960 A1* | 7/2017 | Boutros | H04L 41/5054 |
| 2017/0207963 A1* | 7/2017 | Mehta | H04L 61/6022 |
| 2017/0207976 A1 | 7/2017 | Rovner et al. | |
| 2017/0207997 A1* | 7/2017 | Martin | H04L 43/0882 |
| 2018/0013556 A1 | 1/2018 | Saavedra | |
| 2019/0052558 A1 | 2/2019 | Mehta et al. | |
| 2019/0058656 A1 | 2/2019 | Gundersen et al. | |
| 2019/0280962 A1 | 9/2019 | Michael et al. | |
| 2021/0014170 A1 | 1/2021 | Huang et al. | |

OTHER PUBLICATIONS

Applicant-Initiated Interview Summary for U.S. Appl. No. 15/409,019 (dated Mar. 15, 2019).
Non-Final Office Action for U.S. Appl. No. 15/409,019 (dated Dec. 6, 2018).
Restriction and/or Election Requirement for U.S. Appl. No. 15/409,019 (dated Aug. 30, 2018).
International Search Report and Written Opinion for International Patent Application Serial No. PCT/US2020/051882 (dated Dec. 11, 2020).
"VMware SD-WAN Enables Managed WAN for Service Providers," VMware, Inc., pp. 1-4 (Apr. 2019).
"Virtual Networks Orchestration (VNO)," Nokia Networks, pp. 1-6 (2019).
"Managed SD-WAN: Challenges for Service Providers," Versa Networks, pp. 1-5 (2019).
"Sevone Partners with Versa Networks to Support Secure SD-WAN Deployments," Versa Networks, pp. 1-6 (2019).
"Accelerate Service Revenues with EdgeConnectSP," Silver Peak Systems, Inc., pp. 1-8 (2019).
"Shared Customer Premise Equipment (CPE) Deployment in Multi-Tenant Units," HCL Technologies Limited, pp. 1-4 (2019).
"Unity OrchestratorSP Intelligent automation software powering the Unity EdgeConnect SD-WAN platform," Silver Peak Systems, Inc., pp. 1-5 (2019).
"Streamline and Differentiate SD-WAN Service through Multi-Domain Service Orchestration," White Paper, BluePlanet, Ciena Corporation, pp. 1-7 (Dec. 2018).
"Juniper Networks Cloud CPE Solution," Juniper Networks, Inc., pp. 1-6 (Nov. 2018).
"Contrail SD-WAN Design & Architecture Guide," Juniper Networks, Inc., pp. 1-46 (2018).

* cited by examiner

300

```
1   <miniconfig name="Duluth" revision="R8_0_DEV_09172018-28-gf52d5fd" timestamp="1537392666">
2    <cloud_global_properties define="set">
3     <param name="encryption_mode" value="aes128" default="aes128"/>
4     <param name="enhanced_message_authentication" value="false" type="boolean"/>
5     <param name="enhanced_message_authentication_type" value="checksum" default="checksum"/>
6     <param name="enhanced_packet_uniqueness" value="false" type="boolean"/>
7     <param name="encryption_rekey_enabled" value="true" type="boolean" default="true"/>
8     <param name="subscriber_apn_name" value=""/>
9    </cloud_global_properties>
10   <virtual_wan_link access_type="public_internet" name="CL1-WL-NAT" id="342" braces="true" define="add">
11    <param name="name" value="CL1-WL-NAT" maxlength="32"/>
12    <properties define="set">
13     <param name="ID" value="0" type="integer" default="0" required="true"/>
14     <param name="access_type" value="public_internet" default="public_internet" maxlength="16"/>
15     <param name="wan_ingress_physical_rate_kbps" value="10000" type="integer" default="0" required="true" min="100"/>
16     <param name="wan_egress_physical_rate_kbps" value="10000" type="integer" default="0" required="true" min="100"/>
17     <param name="wan_ingress_permitted_rate_kbps" value="10000" type="integer" default="" min="1"/>
18     <param name="wan_egress_permitted_rate_kbps" value="10000" type="integer" default="" min="1"/>
19     <param name="mtu_bytes" value="" type="integer" default="1500" min="512" max="2018"/>
20     <param name="public_ip_addr" value="" type="ip"/>
21     <param name="enable_public_ip_learning" value="true" type="boolean"/>
    ...
```

METHODS, SYSTEMS, AND COMPUTER READABLE MEDIA FOR PROVIDING A MULTI-TENANT SOFTWARE-DEFINED WIDE AREA NETWORK (SD-WAN) NODE

TECHNICAL FIELD

The subject matter described herein relates to communications networks. More particularly, the subject matter described herein relates to methods, systems, and computer readable media for providing a multi-tenant software-defined wide area network (SD-WAN) node.

BACKGROUND

A wide area network (WAN) can be used to connect multiple sites, offices, and/or local area networks (LANs) for networking purposes. For example, an enterprise (e.g., a business or university) may have several branches or offices in multiple locations that need to connect to data centers and each other. In this example, the enterprise may use WAN links (e.g., leased telecommunications circuits and/or other techniques for physical and/or virtual connections like packet switching or circuit switching connections) to connect the various locations within the WAN and to maintain or achieve a desired service level (e.g., security, bandwidth, and/or latency requirements). WANs may use encryption and various network protocols when sending traffic via WAN links and, as such, various network nodes may be needed to route, process, and/or facilitate WAN related communications.

A software-defined WAN (SD-WAN) involves using software-defined networking (SDN) concepts to create and manage a WAN. For example, an SD-WAN may include a number of physical and/or virtual nodes or appliances that are programmable by a network controller for handling or facilitating WAN related communications. An SD-WAN may also utilize lower-cost and commercially available Internet access and related network equipment in lieu of more expensive WAN connection technologies and specialized equipment. While SD-WANs can be useful for connecting multiple sites in an effective and cost-efficient manner, issues can arise when attempting to connect WAN users to networks or services, such as cloud services, controlled by others. For example, since many cloud service providers are serving multiple customers, it is impractical for the service provider to allow each enterprise to place an SD-WAN appliance in their network. Further, it is unlikely that the service provider is by default (e.g., via Internet connections) providing its cloud services at a service level desirable to all WAN-based users. Moreover, service providers lack an effective and cost efficient way to provide SD-WANs reliable access to cloud services and, as such, SD-WAN users may not receive cloud services at a service level that they are accustomed.

SUMMARY

Methods, systems, and computer readable media providing a multi-tenant software-defined wide area network (SD-WAN) node are disclosed.

One method occurs at a first network node in a service provider network for providing at least one service to multiple tenants. The method includes generating, using input from an administrator of the service provider network, user configuration information for a first tenant, wherein the user configuration information includes a security key for allowing the first tenant to configure aspects of the first network node and a total bandwidth limit associated with the first tenant; sending, to the first tenant, at least some of the user configuration information; receiving, from the first tenant, first configuration information for configuring a first conduit for tunneling communications between the service provider network and a first site associated with the first tenant's SD-WAN; configuring, using the first configuration information, the first conduit for tunneling communications between the service provider network and the first site, wherein the first network node is associated with a plurality of conduits, wherein a second conduit of the plurality of conduits is at least in part configured by a second tenant and not the first tenant; and tunneling, via the first conduit, communications between the service provider network and the first site.

One system includes a first network node in a service provider network for providing at least one service to multiple tenants. The first network node includes at least one processor and memory. The first network node is configured for: generating, using input from an administrator of the service provider network, user configuration information for a first tenant, wherein the user configuration information includes a security key for allowing the first tenant to configure aspects of the first network node and a total bandwidth limit associated with the first tenant; sending, to the first tenant, at least some of the user configuration information; receiving, from the first tenant, first configuration information for configuring a first conduit for tunneling communications between the service provider network and a first site associated with the first tenant's SD-WAN; configuring, using the first configuration information, the first conduit for tunneling communications between the service provider network and the first site, wherein the first network node is associated with a plurality of conduits, wherein a second conduit of the plurality of conduits is at least in part configured by a second tenant and not the first tenant; and tunneling, via the first conduit, communications between the service provider network and the first site.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory.

As used herein, the terms 'function' or 'module' refer to software in combination with hardware and/or firmware for implementing features described herein.

BRIEF DESCRIPTION OF THE DRAWINGS

The subject matter described herein will now be explained with reference to the accompanying drawings of which:

FIG. 3 is a diagram illustrating example APN configuration information usable for configuring aspects of an SD-WAN node;

FIGS. 4A-4C are diagrams illustrating graphical user interfaces (GUIs) for configuring aspects of an SD-WAN node;

DETAILED DESCRIPTION

Figure 1:
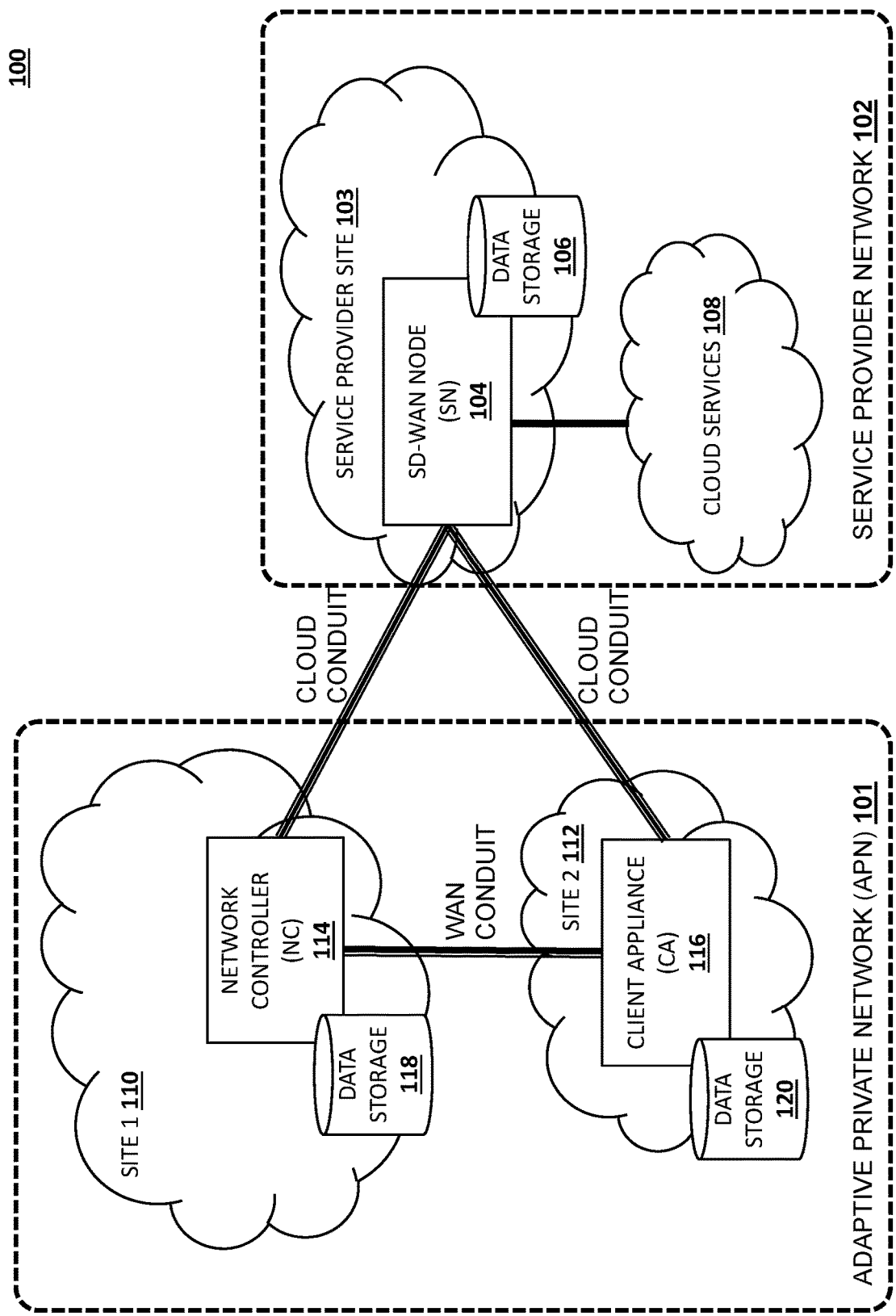
FIG. 1 is a diagram illustrating an example communications environment utilizing a multi-tenant software-defined wide area network (SD-WAN) node.

The subject matter described herein relates to methods, systems, and computer readable media for providing a multi-tenant software-defined wide area network (SD-WAN) node. Generally, an SD-WAN may be managed as a single administrative domain. For example, nodes of the SD-WAN may be managed by a network administrator and that network administrator may have full control of the configuration parameters of the SD-WAN. However, since many SD-WAN users desire access to cloud services that are provided by third parties, issues can arise when attempting to provide such cloud services to SD-WAN users at a service level consistent with the SD-WAN. One possible solution for connecting SD-WAN users and cloud services may involve placing a node of the SD-WAN in a service provider network. This local SD-WAN node may then be used to provide an improved (e.g., highly reliable) network path to Internet-based applications or services hosted by the service provider. However, the service provider may not want to manage hundreds or thousands of SD-WAN nodes for their customers. Also, the service provider may not want to allow an outside network administrators unfettered access to the service provider network so that they can configure their own SD-WAN node. As such, the service provider would prefer to control at least some aspects of any local SD-WAN node in its network.

In accordance with some aspects of the subject matter described herein, techniques, methods, systems, or mechanisms are disclosed for providing a multi-tenant SD-WAN node. For example, a network node (e.g., an SD-WAN node) or service gateway in accordance with at least some aspects described herein may be in a service provider network and provide at least one service to one or more tenants (e.g., administrative domains, enterprises, or related SD-WANs). In this example, the network node or service gateway or aspects therein may be safely administered from several different administrative domains with no possibility that the different administrative domains will interfere with each other. Continuing with this example, the different administrative domains may be prevented from interfering with each other by security measures (e.g., unique preshared keys) and/or access designs (e.g., tenant-specific bandwidth limits, tenant-specific and/or site-specific conduits, etc.).

In accordance with some aspects of the subject matter described herein, techniques, methods, systems, or mechanisms are disclosed for receiving configuration information from multiple tenants and from a service provider and merging or shaping this configuration information into a single runtime configuration for a SD-WAN node that satisfies the requirements of the tenants and the service provider. For example, a network node or service gateway in accordance with at least some aspects described herein may be configured to allow each tenant to configure aspects (e.g., encryption and protocol settings) of one or more conduits (e.g., communications tunnels using multiple WAN links for connecting a service provider network to an SD-WAN site), while allowing the service provider to configure various other aspects, e.g., how many sites each tenant can connect to the service provider network and a total bandwidth for each tenant). In this example, the configuration for each tenant may be performed independently and may occur at various times (e.g., configuration is performed without requiring coordination between any of the tenants).

In accordance with some aspects of the subject matter described herein, techniques, methods, systems, or mechanisms are disclosed for allowing an SD-WAN node to utilize a high-precision time synchronization mechanism for monitoring conduits or WAN links thereof for latency and other issues, e.g., so that packets can be sent on the WAN link with the lowest latency. For example, an SD-WAN node may send and receive traffic via multiple WAN links associated with different tenants, where each of the tenants maintain their own time synchronization mechanism for monitoring the state of their WAN links. Since each of the time synchronization mechanisms may differ slightly with each other, a network node or service gateway in accordance with at least some aspects described herein may maintain and/or utilize a separate time synchronization mechanism (e.g., a master clock) for conduits associated with the network node or service gateway. In another example, e.g., where existing time synchronization mechanisms are used by different tenants, a network node or service gateway in accordance with at least some aspects described herein may maintain and/or utilize a separate time synchronization mechanism for each conduit associated with the network node or service gateway.

In accordance with some aspects of the subject matter described herein, techniques, methods, systems, or mechanisms are disclosed for identifying and/or distinguishing SD-WANs and related WAN links associated with different tenants where the WAN links may use the same identifiers. For example, a network node or service gateway in accordance with at least some aspects described herein may maintain or store WAN link identifiers associated with each tenant along with unique tenant and/or site identifiers. In this example, during configuration, when the network node or service gateway receives WAN link identifiers '1' and '2' associated with a site 'X' of tenant 'A', the network node or service gateway may store the information using a data structure (e.g., a hash table that uses the tenant and/or site identifiers as input and corresponding WAN link identifiers as output) such that the tenant and/or site identifiers can identify corresponding WAN link identifiers, particularly when the WAN link identifiers are not unique on their own.

In accordance with some aspects of the subject matter described herein, techniques, methods, systems, or mechanisms are disclosed for establishing and removing dynamic cloud conduits. For example, when user traffic directed to or from a service provider is detected, a cloud conduit between an SDN-WAN node in a service provider network and a client appliance in an SDN-WAN site of a tenant (e.g., an enterprise network) may be established. Once the cloud conduit is established, a heartbeat process may be used to determine when the cloud conduit is no longer needed. For example, the client appliance may periodical poll the SD-WAN node in the service provider network using connection status requests. In this example, the SD-WAN node may reply to the connection status requests and may track any missed connection status requests from the client appliance. Continuing with this example, if a pre-determined number of consecutive connection status requests is missed, the SD-WAN node may assume that the client appliance is either non-operational or no longer has a cloud conduit connection active. In response to determining the cloud conduit is no longer needed, the SD-WAN node may automatically clean up the resources used for the connection to the client appliance so that the resources are available for use by other client appliances.

Advantageously, by providing a multi-tenant SD-WAN node that can interact with or be a part of separate, independent SD-WANs, service providers are able to provide cloud services (e.g., Internet-based applications, cloud-based storage, etc.) to SD-WAN users more reliably and in an effective and cost-efficient manner. For example, a multi-tenant SD-WAN node (e.g., an SD-WAN service gateway in a service provider network) may provide a solution to service providers that they can deploy and sell as a service to their enterprise customers a highly reliable method of accessing business-critical Internet hosted services, where each tenant can configure aspects of the SD-WAN node while also preventing each tenant from interfering with configurations of the service provider or other tenants. Further, by using dynamic cloud conduits, service providers can efficiently use resources since the SD-WAN node can detect inactivity of dynamic cloud conduits and can free up related resources associated with any inactive cloud conduit, thereby allowing the resources to be reallocated to another cloud conduit and/or tenant.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example communications environment 100 utilizing an SD-WAN node. Referring to FIG. 1, communications environment 100 may include an adaptive private network (APN) 101 and a service provider network 102. APN 101 may represent various network nodes, equipment, and user devices associated with an administrative domain. In this example, APN 101 may also be referred to a SD-WAN and may use SD-WAN technology, WAN links, and related equipment to connect the sites. For example, APN 101 may represent an enterprise network comprising multiple sites, e.g., site 110 and site 112, communicatively connected via SD-WAN nodes or appliances. In this example, the SD-WAN nodes or appliances may be configured to use WAN links and related equipment for tunneling communications between sites using encryption and encapsulation techniques.

Each of site 110 and site 112 may represent a LAN, a sub-network, or a physical location (e.g., an office building) associated with APN 101, where each site may include various devices, equipment, and/or appliances. As depicted in FIG. 1, site 110 may include a network controller (NC) 113 and data storage 118 and site 112 may include CA 116 and data storage 120. In some embodiments, a site (e.g., site 110) that includes NC 114 may not include or utilize a separate CA. Instead, in such embodiments, NC 114 may include functionality similar to CA 116 and may facilitate cloud conduit connections between site 110 and other sites of APN 101 and/or cloud conduit connections between site 110 and service provider network 102.

In some embodiments, APN 101 may have an active network controller (e.g., NC 114) and a standby network controller that can become active when a failover occurs. In such embodiments, the active network controller may be at the same site as the standby network controller or at a different site.

NC 114 may represent any suitable entity or entities (e.g., software executing on a processor, an FPGA, an ASIC, or a combination of software, an FPGA, and/or an ASIC) for performing one or more aspects associated with controlling or managing an SD-WAN (e.g., APN 101) and related network nodes, e.g., CA 116. In some embodiments, NC 114 may be implemented using one or more processors and/or memory. For example, NC 114 may utilize one or more processors (e.g., executing software stored in memory) for configuring CA 116. In this example, NC 114 may also utilize one or more processors to send instructions or network information to various modules or entities in APN 101 or service provider network 102. In some embodiments, NC 114 may include or interact with a master clock controller, a time synchronization module, or related functionality. For example, a time synchronization module may be responsible for time synchronization with APN and may send sync signals (e.g., time synchronization information) periodically to keep common clocks or slave clocks synchronized.

CA 116 may be any suitable entity or entities (e.g., software executing on a processor, an FPGA, an ASIC, or a combination of software, an FPGA, and/or an ASIC) for connecting sites in APN 101. In some embodiments, CA 116 may be configured to use one or more WAN conduits, e.g., logical entities, for tunneling communications between locations. In some embodiments, each conduit may use WAN links (e.g., a group of IP addresses connected using commercially available Internet access, cellular networks, leased lines, and/or other connection technologies) and communications that traverse a conduit may use one or more network protocols (e.g., encapsulation protocols) and/or encryption techniques.

In some embodiments, CA 116 may use network management protocols, link aggregation techniques, and/or congestion avoidance mechanisms to reduce latency, increase bandwidth, and otherwise maintain one or more reliable connections between sites 110 and 112. For example, CA 116 and/or SN 104 may monitor paths (e.g., WAN links) associated with a conduit to track state and latency of the paths before sending packets via a viable (e.g., low latency) path. In this example, if a packet is lost, a packet may be retransmitted it via a different path.

In some embodiments, monitor paths (e.g., WAN links) associated with a conduit may involve periodically sending (e.g., every 50 milliseconds) status update messages or other messages to SN 104 and using the information obtained from these messages to select an appropriate link for sending packets from one location to another location.

Each of data storages 118 and 120 may represent any suitable entity (e.g., a computer readable medium or memory) for storing APN configuration information, CA configuration information, and/or other data. For example, each of data storages 118 and 120 may store network information sent from NC 114 and may store state information associated with communications traversing a WAN conduit.

Service provider network 102 may represent various network nodes, equipment, and/or devices associated with providing cloud services 108. Service provider network 102 may include a service provider site 103 for interfacing with cloud services 108, e.g., Internet-based applications, cloud-based storage, Internet-based collaboration tools, etc. For example, service provider site 103 may include Internet-facing hosts and servers for receiving user requests for cloud services 108 and for responding to the user requests. In this example, service provider site 103 may communicate with cloud services 108 via various connection technologies and/or network equipment. For example, cloud services 108 may include a separate enterprise network, data centers, and network equipment controlled by the service provider and may be connected to service provider site 103 and/or the Internet via multiple, redundant connection technologies.

Cloud services 108 may represent any suitable entities (e.g., networks, nodes, devices, equipment, etc.) associated with providing or hosting Internet-based or third-party hosted applications or services. For example, cloud services 108 may include a voice over Internet protocol (VoIP) service, software as a service (SAAS), or an Internet back-haul service. In this example, communications (e.g., user responses) may be generated by one or more nodes associated with cloud services 108 and may be communicated to service provider site 103 via an internal network, an external network, a direct link, or other connection technologies.

Service provider site 103 may include an SD-WAN node (SN) 104 and data storage 106. SN 104 may be any suitable entity or entities (e.g., software and/or VMs executing on one or more processors in a computing platform) for connecting APN 101 and service provider network 102. Data storage 106 may represent any suitable entity (e.g., a computer readable medium or memory) for storing APN configuration information, SN configuration information, and/or other data. For example, data storage 106 may store configuration information provided by tenants and by the service provider and may also store state information associated with communications traversing a cloud conduit, e.g., between service provider site 103 and site 110 or 112.

Figure 2:
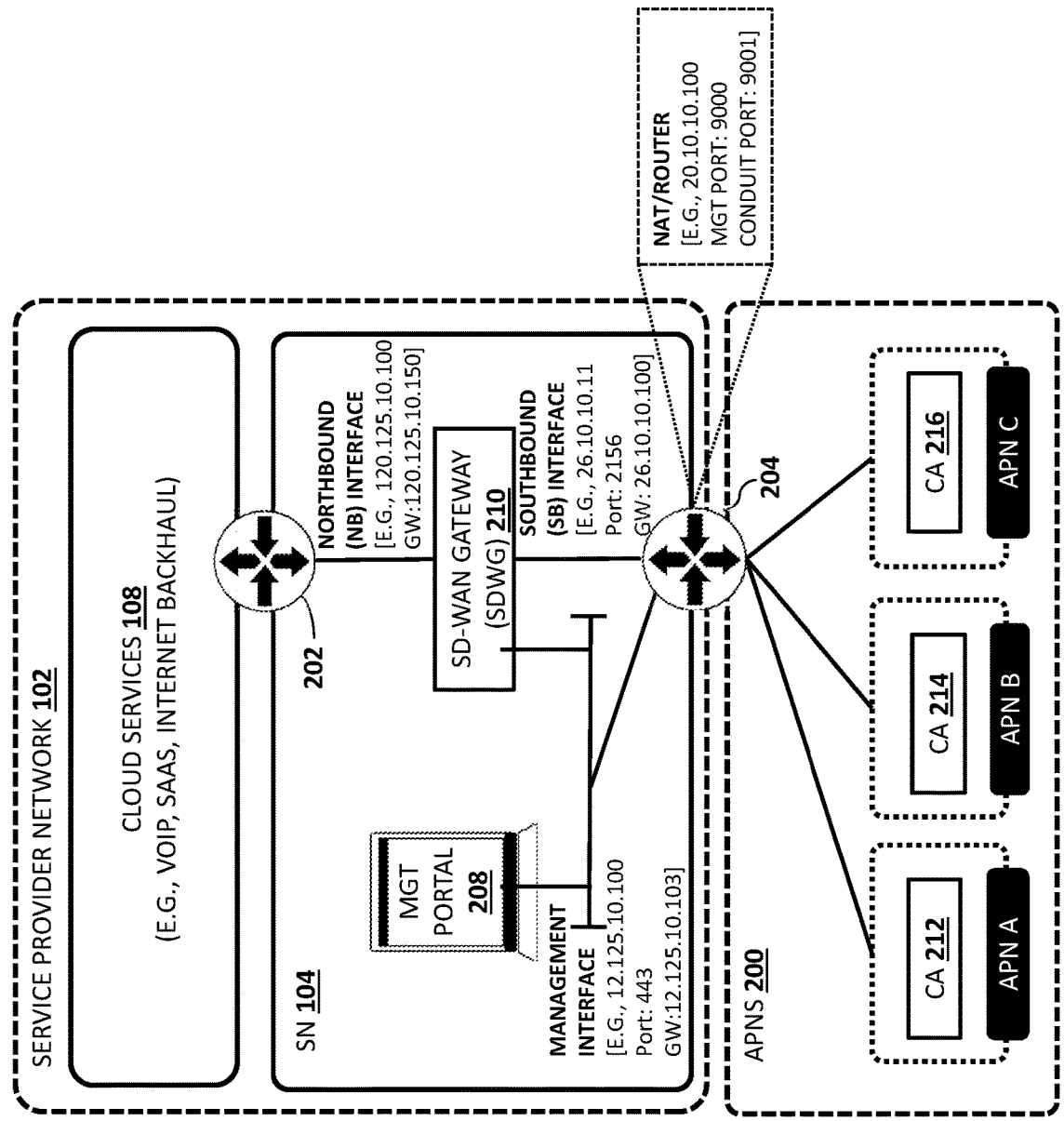
FIG. 2 is a diagram illustrating an example SD-WAN node for providing cloud services to adaptive private networks (APNs)

In some embodiments, SN 104 may represent a multi-tenant SD-WAN node and may be configurable for providing cloud services 108 to APNs or sites thereof controlled by different tenants (e.g., administrative domains) by utilizing configurable cloud conduits. For example, SN 104 may be configured to use one or more cloud conduits (e.g., IP addresses of nodes in different networks or site connected via the Internet) for tunneling communications between APN 101 and service provider network 102 using encryption and/or packet encapsulation. In another example, as depicted in FIG. 2, SN 104 may connect service provider network 102 to multiple APNs via cloud conduits.

In some embodiments, each cloud conduit may use or comprise physical and/or virtual links (e.g., a group of IP addresses connected using commercially available Internet access, cellular networks, leased lines, and/or other connection technologies) and may be associated with various network protocols and/or encryption settings. For example, endpoints (e.g., CA 116 and SN 104) of a cloud conduit may convert or modify packets for conduit traversal, e.g., by encapsulation, encryption, and/or packet header manipulation. In this example, packet conversion and/or modification may obfuscate a conduit end user's identity, thereby making it difficult to discern the identity of a tenant by an outside entity (e.g., an Internet-based node along the cloud conduit path).

In some embodiments, SN 104 may use network management protocols, link aggregation techniques, and/or congestion avoidance mechanisms to reduce latency, increase bandwidth, and otherwise maintain one or more reliable connections between service provider network 102 and APN 101 or sites therein. For example, SN 104 may send network status update messages via a conduit or link thereof every 50 milliseconds and may use information obtained from these messages to select an appropriate link for tunneling communications between service provider network 102 and APN 101 or sites therein.

In some embodiments, SN 104 may be configured to provide at least one of cloud services 108 to one or more tenants. For example, APN 101 may represent a network associated with a tenant (e.g., APN 101 or an administrator thereof) that is authorized by a service provider to configure aspects of SN 104 for establishing one or more cloud conduits between service provider network 102 and APN 101 or sites therein. In this example, SN 104 may be configured to allow other tenants (e.g., administrators of various other APNs) to administer aspects of SN 104 without interfering with APN 101. In this example, SN 104 prevents such interference by using security measures (e.g., each tenant or related APN has a unique security key for authentication) and access, permission, and usage features (e.g., tenant bandwidth limits set by the service provider, tenant-specific and/or site-specific conduits, etc.) that keep tenants and their workloads independent.

In some embodiments, SN 104 may be configured to receive APN configuration information from tenants and to receive other configuration information from a service provider, e.g., using an API, a web-based interface, or user interface associated with SN 104. For example, SN 104 may facilitate tenant related configuration of SN 104 by allowing each tenant to configure aspects (e.g., encryption and protocol settings) of one or more cloud conduits and to determine bandwidth allocations from one or more bandwidth capacities configured by the service provider. In this example, SN 104 may also facilitate service provider related configuration of SN 104 by allowing the service provider to configure other aspects, e.g., a security key for each tenant, how many sites each tenant can connect to service provider network 102 and a total bandwidth for each tenant, APN, and/or site).

In some embodiments, configuration information from various sources may be merged or otherwise shaped into a runtime configuration for SN 104 that satisfies the requirements of the tenants and the service provider. For example, when an APN administrator applies changes to their APN configuration, configuration parameters that are relevant to SN 104 may be automatically detected and/or provided to SN 104 via an API, e.g., a REST API. In this example, the API exposed by the service provider's SD-WAN node may allow the updated configuration information to be received and merged into the configuration of SN 104, e.g., at runtime.

In some embodiments, SN 104 or a related entity may utilize one or more network protocol(s) for detailed measuring and monitoring of the network to ensure conduit traffic is delivered and/or received. For example, managing a cloud conduit may require high-resolution time synchronization and a regular exchange of messages about the status of paths and WAN links to identify and/or mitigate communication issues (e.g., latency or perceived latency). Such conduit management can present challenges because the notion of time can differ across APNs (e.g., SD-WANs) because each APN may use a separate time synchronization mechanism (e.g., a master clock).

In some embodiments, SN 104 may be configured to utilize a local time synchronization mechanism (e.g., a master clock in service provider network 102) for determining whether communications that traverse a cloud conduit are old or late. For example, e.g., regardless of existing time synchronization mechanisms used by the different tenants, SN 104 or related entity may maintain and/or utilize a separate time synchronization mechanism for multiple cloud conduits. In another example, e.g., regardless of existing time synchronization mechanisms used by the different tenants, SN 104 or related entity may maintain and/or utilize a separate time synchronization mechanism for each conduit.

It will be appreciated that FIG. 1 is for illustrative purposes and that various nodes and/or modules, locations, and/or functionality described above in relation to FIG. 1 may be changed, altered, added, or removed.

FIG. 2 is a diagram illustrating an example SN 104 for providing cloud services to APNs. Referring to FIG. 2, SN 104 may be in service provider network 102 and may provide APNs 200 reliable access to cloud services 108 via cloud conduits.

APNs 200 may include APN 'A', APN 'B' and APN 'C'. Each of APNs 200 may represent an SD-WAN network administered by a different tenant (e.g., enterprise or administrative domain). APN 'A' may include CA 212, APN 'B' may include CA 214, and APN 'C' may include CA 216. Each of CAs 212-216 may have functionality similar to CA 116 as described above. For example, each of CAs 212-216 may communicate APN configuration information to SN 104 and may act as an endpoint for one or more cloud conduits between its respective APN (or site thereof) and service provider network 102.

SN 104 may include a management portal 208 and an SD-WAN gateway (SDWG) 210. Management portal 208 may represent any suitable entity for providing GUIs or other means for configuring aspects of SN 104 or a related entity, e.g., SDWG 210. For example, management portal 208 be a virtual appliance (e.g., a virtual machine (VM) or a virtual container) running on SN 104 (e.g., a computing platform) and may provide a web-based administration portal. In some embodiments, management portal 208 may be associated with a private IP address and a port assigned by a service provider or a related administrator.

SDWG 210 may represent any suitable entity for communicating user traffic via cloud conduits. For example, SDWG 210 may be a virtual appliance (e.g., a VM or a virtual container) running on SN 104 (e.g., a computing platform) and may set up and maintain cloud conduits for one or more of APNs 200 using configuration information provided by management portal 208 or related data storage, e.g., data storage 106. In this example, for each cloud conduit, at least some of the configuration information is from an administrator of service provider network 102 and at least some other configuration is from a relevant tenant (e.g., an entity that administers or controls the APN and/or site connecting to service provider network 102 via a cloud conduit).

In some embodiments, prior to cloud conduits being created or established, some configuration information may be provided from a tenant or a related node (e.g., NC 114 or CA 116) to SN 104. Example configuration information provided to SN 104 may include network or site configuration information and settings and may be usable for setting up correctly configured conduits for reliably routing traffic between service provider network 102 and an APN or sites thereof. In some embodiments, the process of providing configuration information to SN 104 may be referred to a 'mini' configuration and the information provided in this process may be referred to 'mini' configuration information.

In some embodiments, cloud conduits may be dynamic with regard to creation and removal. For example, assuming a 'mini' configuration process has been performed, CA 116 may detect when user traffic is destined for a service network provider 102 and may send a trigger message to SDWG 210 for establishing a dynamic cloud conduit. In this example, once the dynamic cloud conduit is established, user traffic may be sent via the cloud conduit. In this example, after determining the cloud conduit is no longer needed or used (e.g., no user traffic traversing the conduit is detected or no status requests are received from CA 116 within a predetermined amount of time), SDWG 210 may automatically clean up or deallocate the resources used for the connection to CA 116 so that the resources are available for (re-)use.

In some embodiments, management portal 208 and SDWG 210 may each be associated with a unique private IP address and a port assigned by the service provider or a related administrator. In such embodiments, NAT/router 204 may represent a device or appliance that uses a public IP address to receive SN related traffic and one or more ports to identify whether to route received SN related traffic to management portal 208 and SDWG 210. For example, traffic from APN 'A' or a related administrator may include either a management port value or a gateway port value as a destination port in an encapsulation packet header. In this example, if NAT/router 204 determines that encapsulation packet header includes a management port value as the destination port, NAT/router 204 may route the packet to the private IP address and port associated with management portal 208 and, if NAT/router 204 determines that the encapsulation packet header includes a gateway port value as the destination port, NAT/router 204 may route the packet to the private IP address and port associated with SDWG 210.

In some embodiments, SDWG 210 may be associated with multiple interfaces and/or IP addresses and ports. For example, SDWG 210 may use at least one private IP address and at least one port for a southbound (SB) interface facing APNs 200 and may use at least one public IP address and at least one port for a northbound (NB) interface facing cloud services 108. Example message flows traversing SN 104 and elements therein are described below with regard to FIGS. 6A-6B.

It will be appreciated that FIG. 2 and its related description are for illustrative purposes and that SN 104 and/or various other entities in FIG. 2 may include additional and/or different modules, components, or functionality.

FIG. 3 is a diagram illustrating example APN configuration information 300 usable for configuring aspects of an SD-WAN node, e.g., SN 104 or SDWG 210. In some embodiments, APN configuration information 300 may include data from a 'mini' configuration process that involves sending some initial configuration information from a site node (e.g., NC 114 or CA 116) to SN 104. For example, APN configuration information 300 may be provided to SN 104 and may be usable for setting up correctly configured conduits for reliably routing traffic between service provider network 102 and an APN or sites thereof. In this example, APN configuration information 300 may include a subset of network or site configuration information and may be communicated to SN 104 before a conduit is created or use for a given APN or site.

In some embodiments, APN configuration information 300 may be sent to SN 104 in a data format that is readable by SN 104 or modules therein. For example, as depicted in FIG. 3, APN configuration information 300 may be provided in an XML data format. In some embodiments, APN configuration information 300 may include cloud global properties, cloud service default information, IPSec properties, advanced properties, cloud service properties, one or more rules, class information, cloud server (e.g., SN) properties, virtual WAN link information associated with the cloud server, autopath group properties, site appliance (e.g., CA) properties, route information, additional cloud service properties, dynamic cloud conduit routing domain information associated with a cloud service, and/or additional virtual WAN link information associated with the cloud service.

In some embodiments, APN configuration information 300 provided to SN 104 may only include information that is recently changed or added. For example, if an APN has adjusted a network protocol used by its WAN links or has added additional encryption measures, APN configuration information 300 that is provided to SN 104 may include this changed or new information, while not providing unchanged configuration information.

Referring to FIG. 3, a portion of an example XML configuration file is depicted. Line 1 of the example XML configuration file may include a 'miniconfig' XML data element indicating a name, revision number, and a time-stamp for the XML configuration file.

Lines 2-9 of the example XML configuration file indicate a 'cloud_global_properties' XML data element indicating an encryption mode parameter (line 3), an enhanced message authentication parameter (line 4), an enhanced message authentication type (line 5), an enhanced packet uniqueness parameter (line 6), an enhanced rekey enabled parameter (line 7), and a subscriber APN name parameter (line 8).

Lines 10-21 of the example XML configuration file indicate a 'virtual_wan_linkaccess' XML data element indicating a WAN link name (line 11), a properties define parameter (line 12), an WAN link identifier parameter (line 13), an access type parameter (line 14), a WAN ingress physical rate limit parameter (line 15), a WAN egress physical rate limit parameter (line 16), a WAN ingress permitted rate limit parameter (line 17), a WAN egress permitted rate limit parameter (line 18), a maximum transmission unit in bytes parameter (line 19), a public IP address parameter (line 20), and an enable public IP learning feature parameter (line 21).

It will be appreciated that FIG. 3 and its related description are for illustrative purposes and that additional and/or different information than that depicted in FIG. 3 may be usable for configuring an SD-WAN node or an aspect thereof. For example, for every conduit and conduit related service, APN configuration information 300 may include parameters and settings for adequately configuring SN 104 or SDWG 210 for handling various services via the conduits.

Figure 4A:
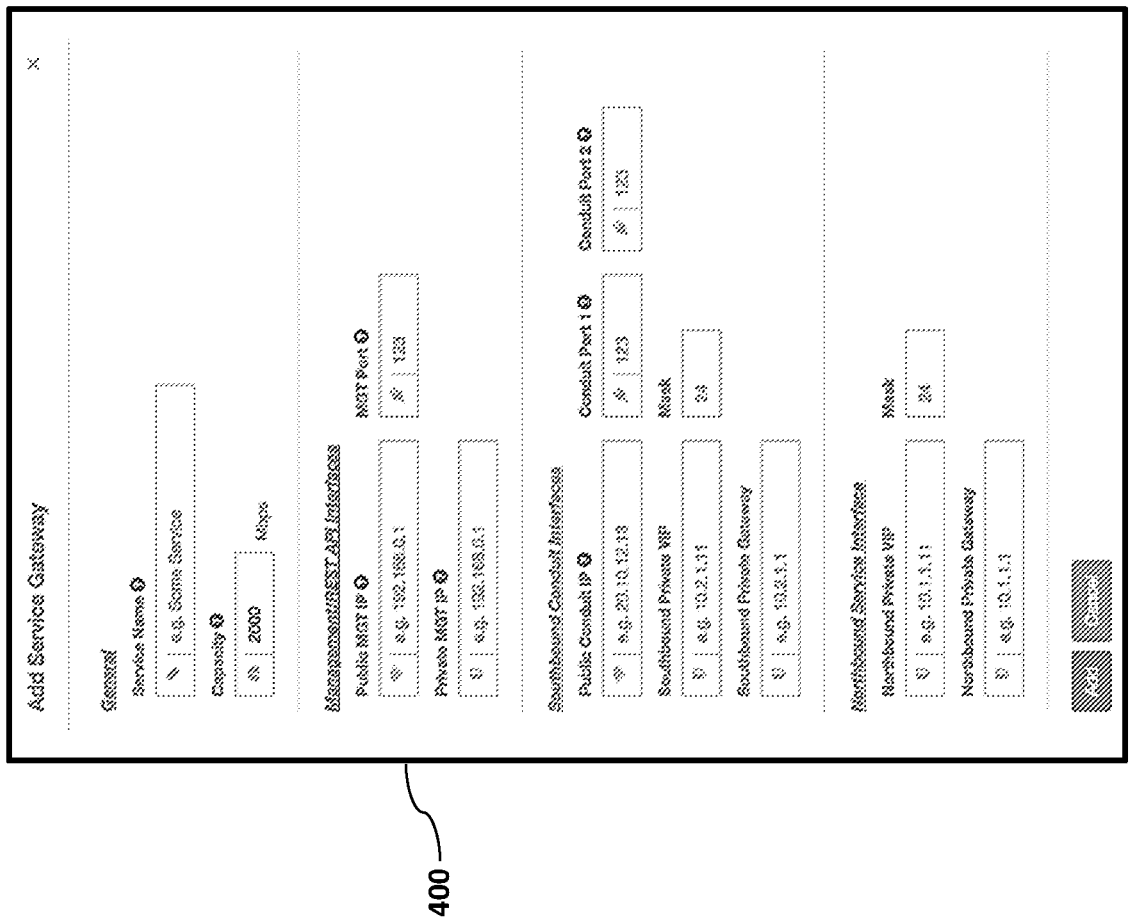
Figure 4B:
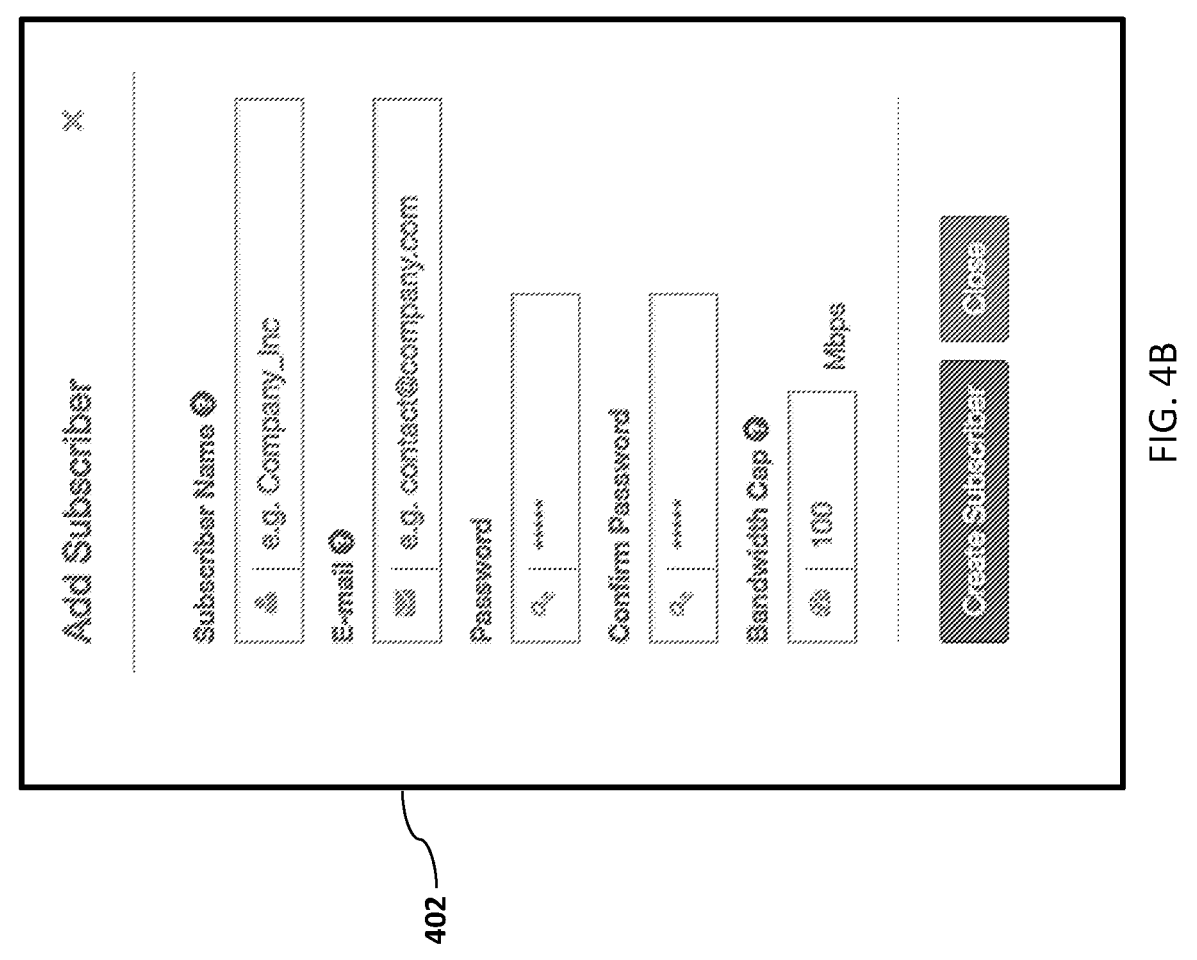
Figure 4C:
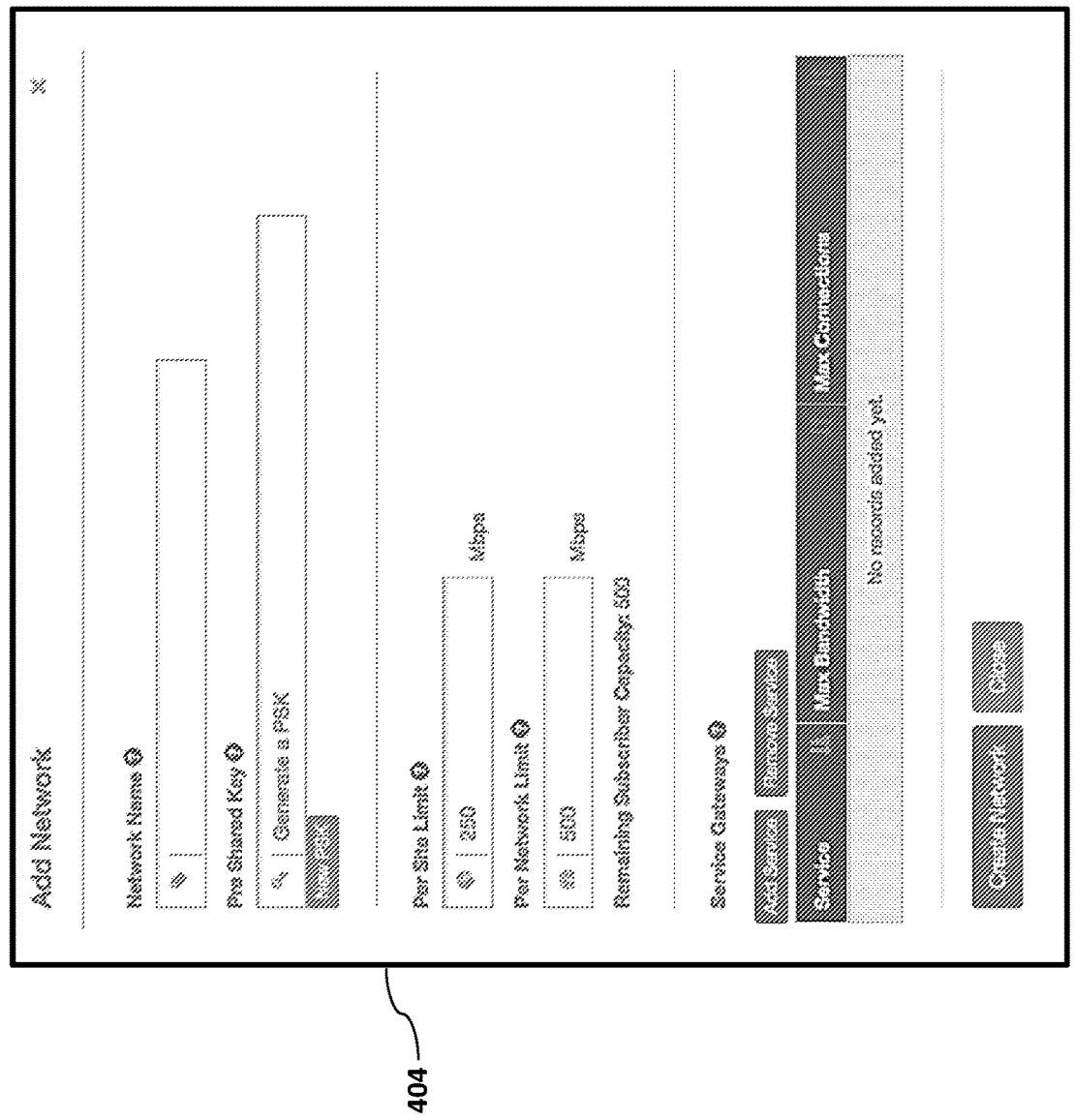

FIGS. 4A-4C are diagrams illustrating GUIs 400-404 for configuring aspects of an SD-WAN node, e.g., SN 104. In some embodiments, GUIs 400-404 may represent various pages provided by management portal 208 usable by a service provider or a related administrator to configure SN 104 or aspects thereof, e.g., SDWG 210. In some embodiments, GUIs 400-404 may also allow a service provider to input various tenant-specific (e.g., subscriber-specific) information, e.g., tenant related bandwidth limits and a maximum number of tenant sites allowed.

In some embodiments, an administrator of service provider network 102 may need to configure SN 104, add authorized subscribers (e.g., tenants), and add one or more authorized APNs that can utilize SN 104. In some embodiments, service provider related configuration may be performed prior to a tenant or subscriber providing APN configuration information 300.

Referring to FIG. 4A, GUI 400 represents a page for receiving input for configuring a service gateway, e.g., SN 104 or SDWG 210. In some embodiments, GUI 400 may include groups of input fields associated with different configuration aspects and actions buttons, e.g., an 'Add' button to add or store inputted information and a 'Cancel' button to close or clear page (e.g., ignore inputted information).

As depicted in GUI 400, a 'General' group may include a service name input field for naming or identifying a particular SD-WAN node in service provider network 102 and a bandwidth capacity input field for indicating a total bandwidth limit associated with the SD-WAN node. For example, the total bandwidth limit may be a value that is based on hardware or other considerations of the service provider and this bandwidth limit may be enforced such that the total bandwidth limit associated with the SD-WAN node is not exceed when bandwidths for all tenants of SN 104 are considered, e.g., combined.

A 'Management/REST API Interfaces' group may include a public management IP address input field for inputting a public IP address for connecting to SDWG 210, a management port input field for inputting a port for connecting to SDWG 210, and a private management IP address input field for inputting a private IP address for connecting to SDWG 210 (e.g., usable by a NAT/router in service provider network 102).

A 'Southbound Conduit Interfaces' group may include a public conduit IP address input field for inputting a public IP address for connecting to the SD-WAN node in service provider network 102 from an APN, a first conduit port input field for inputting a first port for connecting to the SD-WAN node in service provider network 102, a second conduit port input field for inputting a second port for connecting to the SD-WAN node in service provider network 102, a southbound private virtual IP (VIP) address input field for inputting a private VIP address for connecting to an APN-facing interface of SDWG 210 (e.g., usable by a NAT/router in service provider network 102), a southbound private gateway address input field for inputting a gateway address for reaching a router usable to resolve the southbound private VIP address or a related address range as indicated by an inputted mask value, and a mask input field for inputting a value for indicating an address range that can be assigned for the southbound conduit interfaces.

A 'Northbound Services Interfaces' group may include a northbound VIP address input field for inputting a private VIP address for connecting to Internet-facing interface of SDWG 210 (e.g., usable by a NAT/router in service provider network 102), a northbound private gateway address input field for inputting a gateway address for reaching a router usable to resolve the northbound private VIP address or a related address range as indicated by an inputted mask value, and a mask input field for inputting a value for indicating an address range that can be assigned for the northbound service interface.

Referring to FIG. 4B, GUI 402 represents a page for receiving input for configuring a subscriber, e.g., a tenant. In some embodiments, GUI 402 may include multiple input fields associated with different configuration aspects and actions buttons, e.g., a 'Create Subscriber' button to add or store inputted information and a 'Close' button to close or clear page (e.g., ignore inputted information).

As depicted, GUI 402 may include a subscriber name input field for inputting a name or identifier for representing a particular subscriber, an email input field for inputting an email address associated with the particular subscriber, a password input field for inputting a password associated with the particular subscriber, a confirm password input field for inputting the password again to that the password inputted in the password input field is correct; and a bandwidth capacity input field for inputting a total bandwidth limit associated with the subscriber (e.g., the subscriber can manage bandwidth allocation among various sites and/or networks in management portal 208 but cannot exceed this subscriber bandwidth limit set by the service provider).

Referring to FIG. 4C, GUI 404 represents a page for receiving input for configuring a network, e.g., APN 101. In some embodiments, GUI 404 may include multiple input fields associated with different configuration aspects and actions buttons, e.g., a 'Create Network' button to add or store inputted information and a 'Close' button to close or clear page (e.g., ignore inputted information).

As depicted, GUI 404 may include a network name input field for inputting a name or identifier for representing a particular network and a preshared key input field for inputting a preshared key usable for authentication (e.g., so that only an authorized subscriber can interact with and/or modify this network's configuration settings for SN 104). GUI 404 may also include an 'New PSK' button for triggering the generation of a unique preshared key, e.g., by a web server, a security device, or another entity.

GUI 404 may also include a per-site bandwidth limit for inputting a bandwidth limit associated with each site (e.g., a LAN, a sub-network, or a related location) associated with the APN and a per-network bandwidth limit for inputting a bandwidth limit associated with the APN. The per-network bandwidth limit cannot exceed the total subscriber capacity (e.g., inputted via GUI 402). GUI 404 may also provide feedback of remaining subscriber capacity based on the number of sites used and their related bandwidth limits inputted.

GUI 404 may also include user interface elements for associating an APN to one or more service gateways, e.g., SD-WAN nodes in service provider network 102). For example, GUI 404 may include actions buttons, e.g., a 'Add Service' button for selecting a service gateway to associate with the APN and a 'Remove Service' button for removing a service gateway from being associated with the APN. In this example, GUI 404 may provide a table or visual element for indicating maximum bandwidth and maximum connections allowed for each associated service gateway.

It will be appreciated that FIGS. 4A-4C and their related description are for illustrative purposes and that additional and/or different user interface elements may be usable for inputting various information for facilitating configuring aspects of an SD-WAN node by a service provider or a related administrator.

Figure 5:
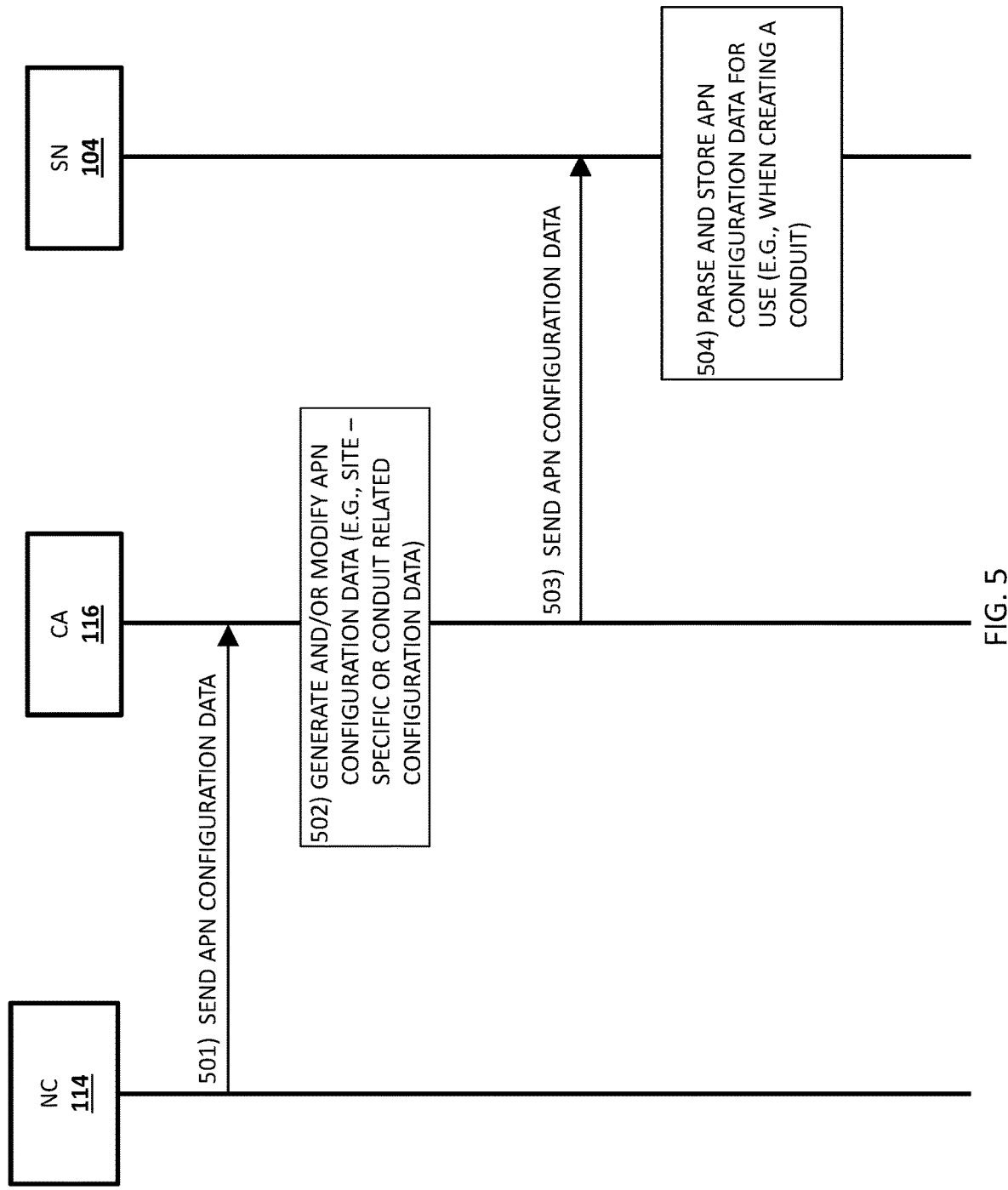
FIG. 5 is a diagram illustrating example actions for providing APN configuration information to an SD-WAN node.

FIG. 5 is a diagram illustrating example actions for providing APN configuration information to SN 104. In some embodiments, APN configuration information may be stored in data file in one or more formats and may sent to SN 104 via a web GUI, an API, or other communications interface. In such embodiments, SN 104 may use received APN configuration information for generating or establishing one or more cloud conduits between SN 104 and the related APN.

Referring to FIG. 5, in step 501, NC 114 may send APN configuration information 300 to CA 116. For example, NC 114 may have access to most, if not all, relevant APN configuration information 300 and may provide this information to CA 116 periodically (e.g., every 10 minutes), dynamically (e.g., when an SD-WAN change is detected), or on request.

In step 502, CA 116 may receive APN configuration information 300 and may, if needed, modify APN configuration information 300 or generated additional configuration information. For example, CA 116 may generate or modify site-specific configuration information and add this information to APN configuration information 300 obtained from NC 114.

In step 503, CA 116 may send APN configuration information 300 to SN 104. For example, CA 116 may utilize a REST API or another mechanism for uploading an APN configuration file to SN 104.

In step 504, SN 104 may receive APN configuration information 300 and may parse and store APN configuration information 300 for future use. For example, SN 104 may store various APN configuration settings in a data structure such that relevant APN configuration settings are retrievable when creating a conduit that connects to that APN or a related site.

It will be appreciated that FIG. 5 is for illustrative purposes and that different and/or additional messages, steps, and/or actions may be used. For example, in lieu of CA 116 communicating APN configuration information 300, another entity (e.g., network controller or an administrator using web-based interface) may provide APN configuration information 300. It will also be appreciated that various messages, steps, and/or actions described herein may occur in a different order or sequence.

Figure 6A:
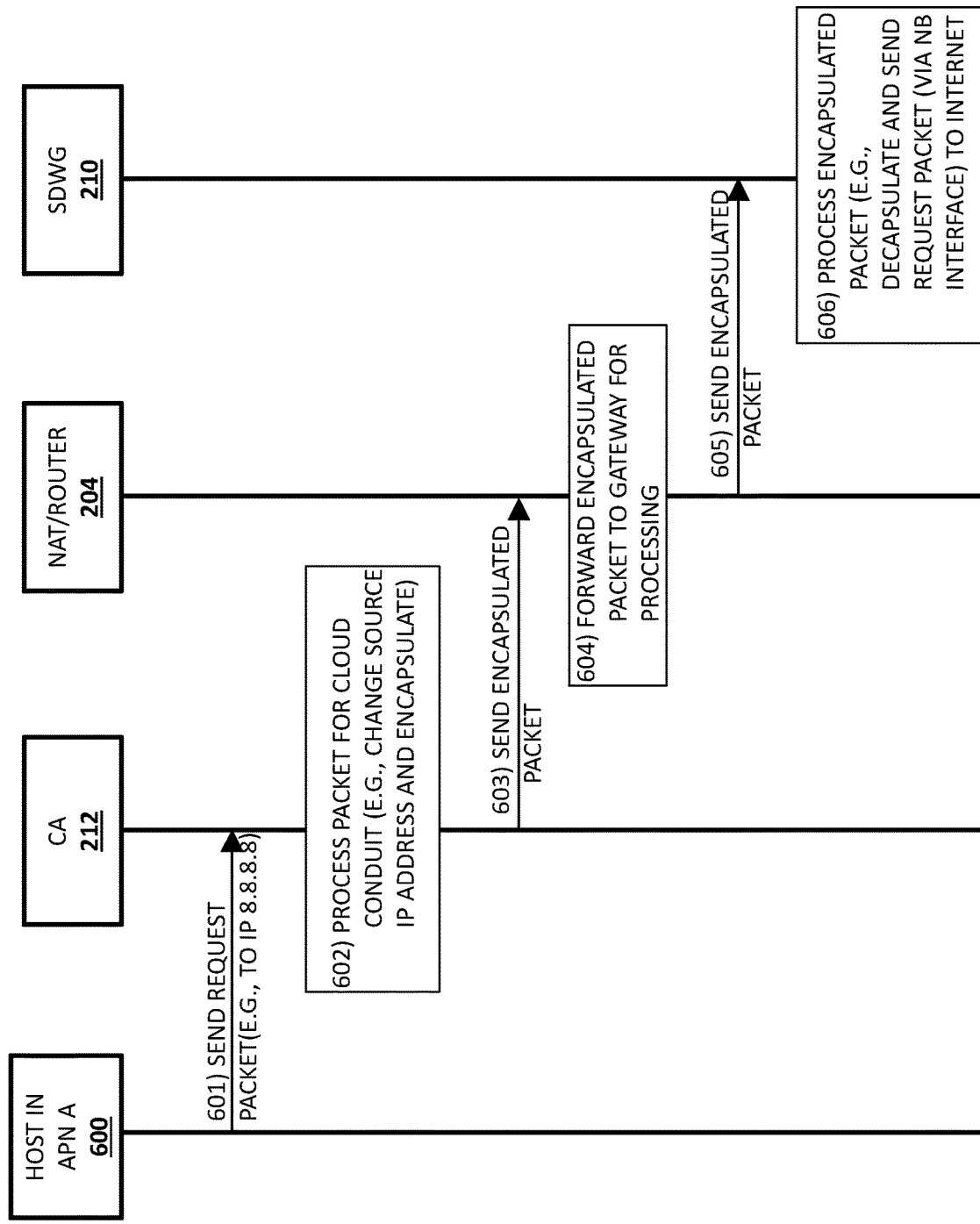
FIGS. 6A-6B are diagrams illustrating example messages traversing a cloud conduit that connects an adaptive private network and a service provider network.
Figure 6B:
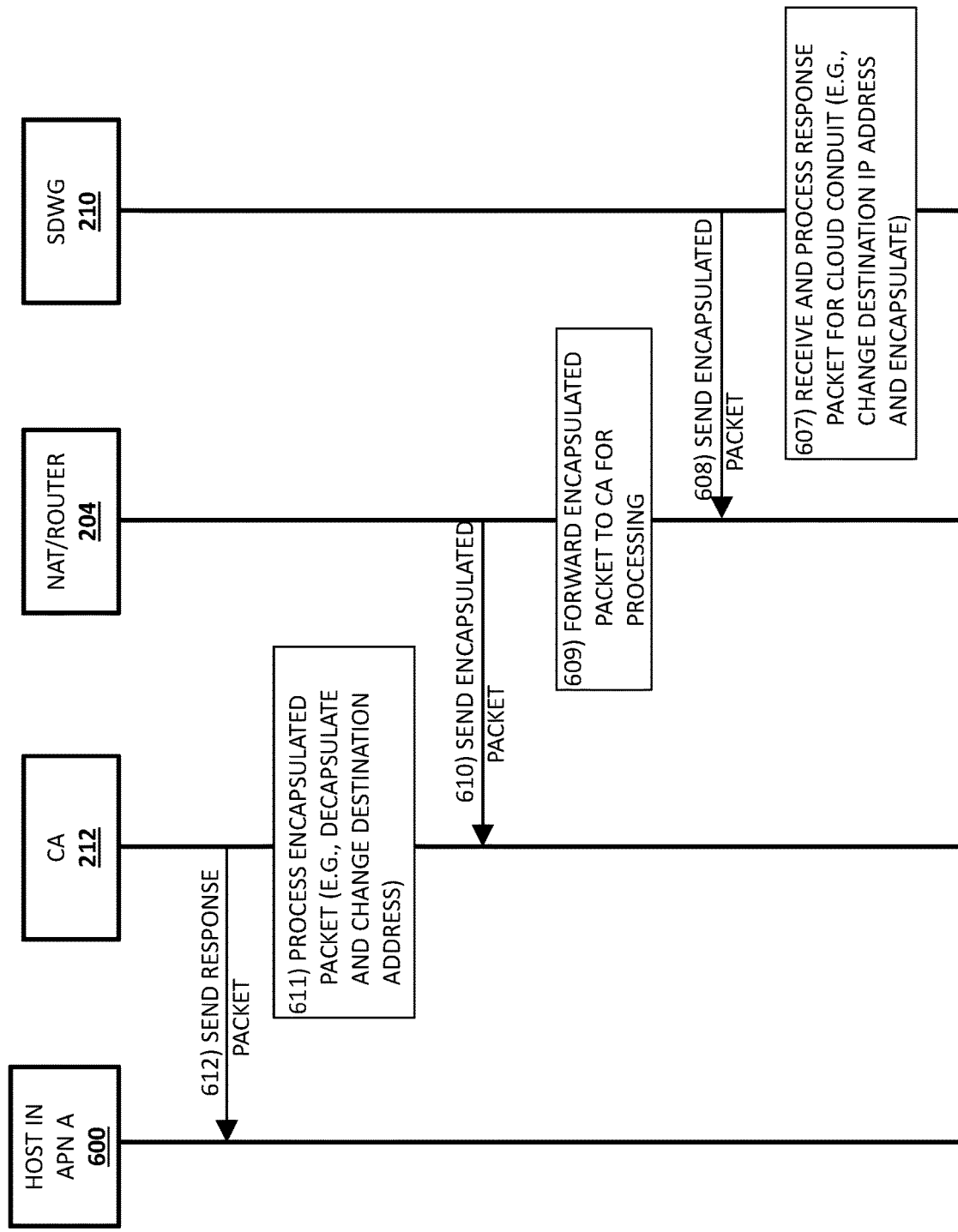

FIGS. 6A-6B are diagrams illustrating example messages traversing a cloud conduit that connects an APN and a service provider network. In particular, FIG. 6A depicts an egress message flow from a host 600 in APN 'A' to SDWG 210 and FIG. 6B depicts an ingress message flow from SDWG 210 to host 600.

In some embodiments, the cloud conduit may utilize one or more WAN links (e.g., connections between public IP addresses) that allow traffic to be tunneled between an APN (or related site) and a service provider network. For example, conduits may transmit packets between public IP addresses of CA 212 (or a related device) in APN 'A' and NAT/router 204 in service provider network 102. In this example, by utilizing multiple WAN links, the cloud conduit has inherent reliability even if a portion of the WAN links go down or have communications issues.

In some embodiments, the cloud conduit may be configured to send communications using a set of encryption and/or protocol settings that were configured by the APN or a related administrator. In some embodiments, the cloud conduit may be dynamic in nature, e.g., the cloud conduit may be set up after a message destined for the service provider network is detected, e.g., by CA 212. In such embodiments, this message may need to be queued until the establishment of the cloud conduit is complete.

In some embodiments, SDWG 210 or another entity of SN 104 may learn or derive public IP addresses of WAN links associated with various APNs or sites thereof. For example, SDWG 210 may receive encrypted packets via a cloud conduit connecting SDWG 210 and CA 212, but SDWG 210 may be unaware of a public IP address associated with CA 212. In this example, to determine or learn the public IP address associated with CA 212, SDWG 210 may attempt packet decryption using different site keys (e.g., previously generated by the service provider and stored in data storage 106) until the packet decryption is successful and, after successful decryption, the source IP address and source port in the packet header are visible. Once the source IP address and source port are learned, SDWG 210 or another entity of SN 104 may associate the learned source IP address and source port with various tenant related identifiers. For example, SDWG 210 may maintain routing table information using a hash based data structure. In this example, a hash key may be based on a (public or external) source IP address and source port and a corresponding hash entry is based on an APN identifier, a WAN link identifier, and a site identifier. In this example, SDWG 210 can identify relevant WAN links associated with a site or conduit even when multiple tenants use a same WAN link identifier because the combination of the WAN link identifier, a related APN identifier, and a related site identifier will be unique.

Referring to FIG. 6A, in step 601, a request packet (e.g., Internet control management protocol echo request packet) may be sent from host 600 in an APN 'A' and may include a header indicating an IP address associated with host 600 as the source address and an IP address associated with an Internet-based service as the destination address. The request message may be destined for an Internet service provider, e.g., an Office 365 web-based application.

In step 602, CA 212 may receive the request packet and may process the request packet for transmission via the cloud conduit. In some embodiments, CA 212 may process the request packet by changing a source address in the request packet header to a WAN link IP address and port associated with CA 212 and may encapsulate the request packet by adding an encapsulation header and/or encrypting the request packet, e.g., as a payload in the encapsulated packet.

In some embodiments, the source IP address and/or other parameters in a request packet header (e.g., step 601) may be changed or hidden from service provider and other tenants for privacy purposes. For example, such obfuscation may be utilize for making the identity of an endpoint sending a packet that traverses a cloud conduit should difficult to discern by the service provider or another entity.

In some embodiments, the encapsulated packet may include an encapsulation header (e.g., a Talari reliable protocol (TRP) header) indicating the WAN link IP address as the source address, an IP address associated with NAT/router 204 as the destination address, and/or a conduit port as the source and destination port.

In step 603, the encapsulated packet may be sent to NAT/router 204 associated with SN 104.

In step 604, NAT/router 204 may receive the encapsulated packet and inspect its header for determining whether to route the packet to SN 104. For example, if the encapsulated packet header indicates a conduit port as the destination port, NAT/router 204 may change the destination address and/or destination port in the encapsulated packet header for directing the encapsulated packet to SDWG 210.

In some embodiments, NAT/router 204 may store state information about the encapsulated packet and/or inner request packet for identifying an appropriate conduit and/or destination in APN 'A' when a corresponding response packet is sent back. For example, NAT/router 204 may use a data structure (e.g., a hash table or a dictionary) that maps a data tuple (e.g., a source IP address and a source port).

In step 605, the encapsulated packet may be sent to SDWG 210.

In step 606, SDWG 210 may receive the encapsulated packet and may decapsulate the encapsulated packet, e.g., by stripping the encapsulation header. SDWG 210 may also modify the source address associated with the request packet from a WAN link IP address associated with CA 212 to a 'northbound' IP address associated with NAT/router 202 for routing traffic destined for cloud services 108.

In some embodiments, NAT/router 202 may store state information about the request packet for identifying an appropriate conduit and/or destination in APN 'A' when a corresponding response packet is sent back. For example, NAT/router 204 may use a data structure that maps a data tuple (e.g., a source IP address and a source port).

In some embodiments, NAT/router 202 may forward or send the request packet toward its destination, e.g., IP address '8.8.8.8'. For example, a service node in service provider network 102 may process the request packet, and a corresponding response may be generated and sent back to NAT/router 202 associated with SN 104. In this example, NAT/router 202 may receive the response packet and send or forward the response packet to SDWG 210.

Referring to FIG. 6B, in step 607, SDWG 210 may receive a response packet corresponding to the request packet and may process the response packet for transmission via the cloud conduit. In some embodiments, SDWG 210 may process the response packet by changing a destination address in the response packet header to an IP address associated with NAT/router 204 and may encapsulate the response packet by adding an encapsulation header and/or encrypting the response packet, e.g., as a payload in the encapsulated packet. In some embodiments, the encapsulated packet may include an encapsulation header (e.g., a TRP header) indicating a private IP address associated with SDWG 210 as the source address, a 'southbound' IP address associated with NAT/router 204 as the destination address, a conduit port as the source and destination port.

In step 608, the encapsulated packet may be sent to NAT/router 204 associated with SN 104.

In step 609, NAT/router 204 may receive the encapsulated packet and inspect its header for determining which conduit to use for routing the encapsulated packet. For example, if the encapsulated packet header indicates the conduit to CA 212 (e.g., based on one or more identifiers or a hash of various values), NAT/router 204 may change the destination address to a WAN link IP address and/or a destination port associated with CA 212 in the encapsulated packet header for directing the encapsulated packet to CA 212. In some embodiments, NAT/router 204 may change the source address in the encapsulated packet header to a public IP address associated with NAT/router 204.

In step 610, the encapsulated packet may be sent to CA 212.

In step 611, CA 212 may receive the encapsulated packet and may decapsulate the encapsulated packet, e.g., by stripping the encapsulation header. CA 212 may also modify the destination address associated with the response packet from the WAN link IP address associated with CA 212 to the IP address associated with host 600.

In step 612, CA 212 may send the response packet to host 600.

It will be appreciated that FIG. 6 is for illustrative purposes and that different and/or additional messages, steps, and/or actions may be used. It will also be appreciated that various messages, steps, and/or actions described herein may occur in a different order or sequence.

Figure 7:
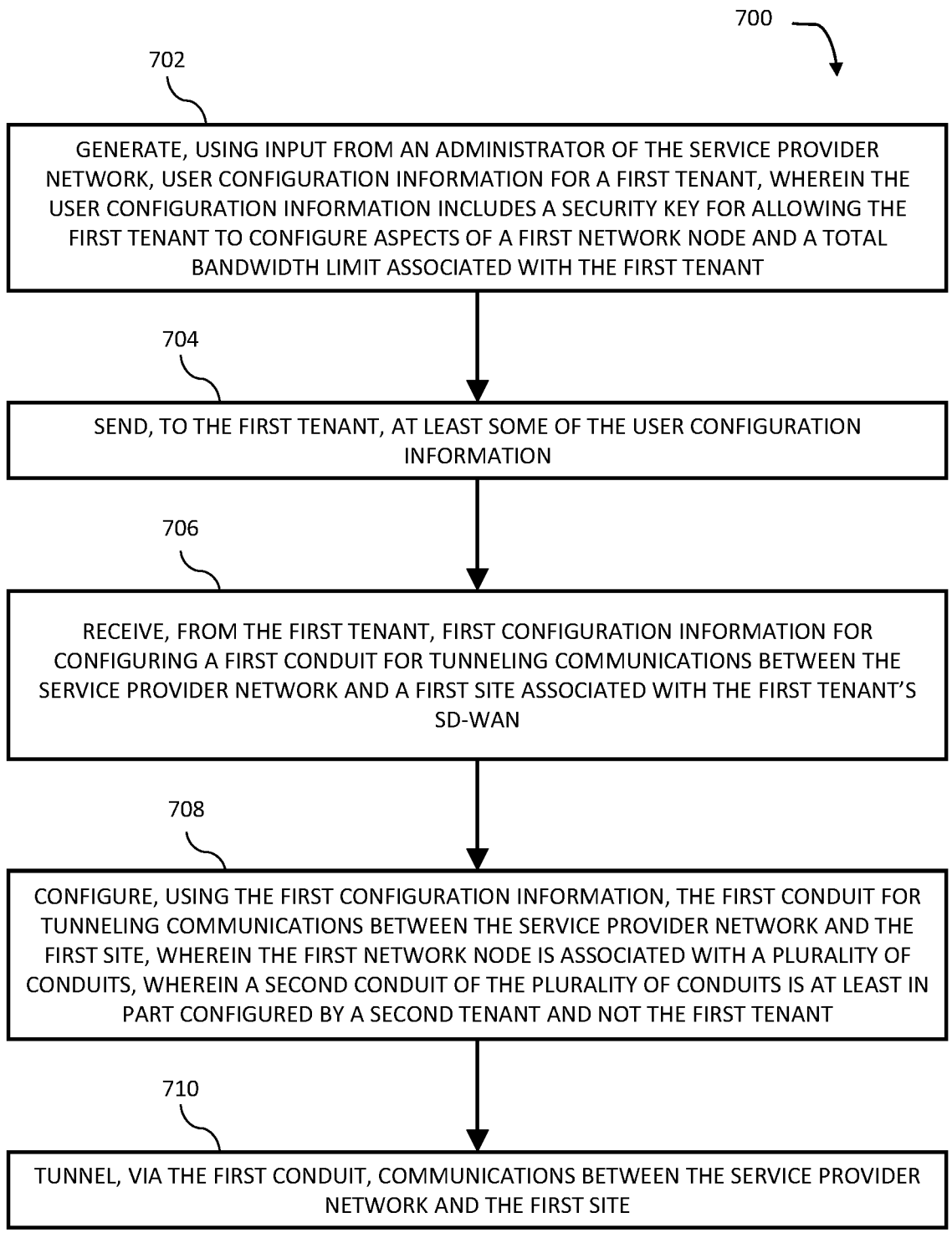
FIG. 7 is a diagram illustrating an example process for providing a multi-tenant SD-WAN node.

FIG. 7 is a diagram illustrating an example process 700 for providing a multi-tenant SD-WAN node. In some embodiments, example process 700 described herein, or portions thereof, may be performed at or performed by a network node (e.g., SN 104), SDWG 210, and/or another module or node.

Referring to example process 700, in step 702, user configuration information for a first tenant may be generated using input from an administrator of the service provider network. In some embodiments, user configuration information may include a security key for allowing the first tenant to configure aspects of the first network node and a total bandwidth limit associated with the first tenant.

In step 704, at least some of the user configuration information may be sent to the first tenant. For example, user configuration information may include a preshared key, a service bandwidth limit, a per-conduit bandwidth limit, a per-site bandwidth limit, and/or a per-network bandwidth limit. In this example, the user configuration information may be configured by a service provider or a related administrator and the user configuration information may be provided via an API or a user interface.

In step 706, first configuration information for configuring a first conduit for tunneling communications between the service provider network and a first site associated with the first tenant's SD-WAN may be received from the first tenant.

For example, CA 116 or NC 114 may send a message containing a 'mini' configuration file to SN 104 via a REST API and/or a web-based management portal 208. In this example, the message may be directed to an IP address associated with SN 104 and may include a preshared key provided to CA 116 or NC 114 by SN 104.

In step 708, the first conduit for tunneling communications between the service provider network and the first site may be configured using the first configuration information (e.g., 'mini' configuration information), wherein the first network node is associated with a plurality of conduits, wherein a second conduit of the plurality of conduits is at least in part configured by a second tenant and not the first tenant.

In some embodiments, the first conduit may be configured after receiving the first configuration information. In such embodiments, the first conduit may be established in response to a trigger message. For example, a trigger message may be a message for requesting at least one service or a message destined for a service provider network. In this example, a trigger message may include any message directed to service provider network 102 or any message for requesting one or more of cloud services 108 and/or destined for service provider network 102. Continuing with this example, the first conduit may be removed (e.g., related allocated resources at SN 104 freed) when inactivity for a predetermined amount of time is detected.

In step 710, communications between the service provider network and the first site may be tunneled via the first conduit. In some embodiments, communications traversing a first conduit may be encapsulated using a first set of protocol and/or encryption settings and communications traversing a second conduit may be encapsulated using a first set of protocol and/or encryption settings, wherein the first set of protocol and/or encryption settings is different from the second set of protocol and/or encryption settings.

In some embodiments, conduit status information and time synchronization information associated with a first tenant may be communicated via a first conduit using a representational state transfer application programming interface (REST API) and/or an encapsulation protocol. For example, a first conduit may use an advanced encryption standard (AES) encrypted tunneling protocol (e.g., a proprietary conduit protocol) with an encapsulating security payload (ESP) tunnel type and 32-bit secure hash algorithm (SHA) based hash value and a second conduit may use a different tunneling protocol with an authentication header (AH) tunnel type and 64-bit SHA based hash value.

In some embodiments, a tenant may represent or include an entity (e.g., an enterprise or company), a network (e.g., APN 101) or site (e.g., site 110) associated with the entity, or a device, node, or appliance associated with the entity. For example, a first tenant may include CA 116, NC 114 or a network administrator associated with APN 101.

In some embodiments, a first network node may include a gateway and a controller implemented using one or more virtual machines or virtual containers. For example, SN 104 may include a SDWG 210 and management portal 208, where SDWG 210 and management portal 208 are Linux based virtual machines.

In some embodiments, a first conduit may be associated with a first time manager implemented at a first network node or a node in a service provider network, wherein the first time manager is separate from a second time manager implemented at a network controller or a node in a first tenant's SD-WAN. For example, SN 104 may utilize a master clock or other time synchronization mechanism for communications via one or more cloud conduits associated with service provider network 102 (e.g., service provider site 103). In this example, NC 114 may provide or utilize another master clock or other time synchronization mechanism for communications within site 110 and/or site 112.

In some embodiments, process 700 may further include receiving, from a first tenant, second configuration information (e.g., 'mini' configuration information) for configuring a third conduit for tunneling communications between a service provider network and a second site associated with the first tenant's SD-WAN; configuring, using the second configuration information, the third conduit for tunneling communications between the service provider network and the second site associated with the first tenant's SD-WAN, wherein a combined bandwidth of a first conduit and the third conduit does not exceed a total bandwidth limit associated with the first tenant; and tunneling, via the third conduit, communications between the service provider network and the second site associated with the first tenant's SD-WAN.

In some embodiments, process 700 may further include learning a public IP address associated with a first site (e.g., site 112), wherein learning the public IP address includes receiving an encrypted packet via a first conduit, decrypting the encrypted packet using stored preshared keys associated with different sites until the encrypted packet is decrypted successfully, and identifying the public IP address from a decrypted packet header. For example, SN 104 or SDGW 210 may learn an IP address associated with CA 116 by attempting to decrypt packets using different preshared keys associated with various APNs or tenants. In this example, after a preshared key successfully decrypts a packet, SN 104 or SDGW 210 may associate the IP source address and the source port located in a packet header of the packet with a related APN identifier, a WAN link identifier, and a site identifier.

In some embodiments, process 700 may further include maintaining statistics and/or traffic monitoring information associated with each conduit, site, and/or tenant.

It will be appreciated that FIG. 7 is for illustrative purposes and that different and/or additional steps and/or actions may be used. It will also be appreciated that various steps and/or actions described herein may occur in a different order or sequence.

It should be noted that a network node, SN 104, SDWG 210, and/or functionality described herein may constitute a special purpose computing device. Further, a network node, SN 104, SDWG 210, and/or functionality described herein can improve the technological field of communications networks and SD-WAN connectivity. For example, by providing a SN 104 in a service provider network capable of facilitating conduits configured by multiple tenants, SD-WAN users can receive cloud services in a reliable manner and/or at a reliable service level. Further, by using a multi-tenant SD-WAN node, a service providers can provide cloud services to SD-WAN users associated with multiple tenants more reliably and in an effective and cost-efficient manner.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing a multi-tenant software-defined wide area network (SD-WAN) node, the method comprising:
    at a first network node in a service provider network for providing at least one service to multiple tenants:
        generating, using input from an administrator of the service provider network, user configuration information for a first tenant, wherein the user configuration information includes a security key for allowing the first tenant to configure aspects of the first network node and a total bandwidth limit associated with the first tenant;
        sending, to the first tenant, at least some of the user configuration information;
        receiving, from the first tenant, first configuration information for configuring a first conduit for tunneling communications between the service provider network and a first site associated with the first tenant's SD-WAN;
        configuring, using the first configuration information, the first conduit for tunneling communications between the service provider network and the first site, wherein the first network node is associated with a plurality of conduits, wherein a second conduit of the plurality of conduits is at least in part configured by a second tenant and not the first tenant;
        tunneling, via the first conduit, communications between the service provider network and the first site; and
        maintaining traffic monitoring information associated with each conduit, site, and/or tenant.

2. The method of claim 1 wherein the communications traversing the first conduit are encapsulated using a first set of protocol and/or encryption settings and wherein communications traversing the second conduit are encapsulated using a second set of protocol and/or encryption settings, wherein the first set of protocol and/or encryption settings is different from the second set of protocol and/or encryption settings.

3. The method of claim 1 wherein configuring the first conduit is in response to a trigger message, wherein the trigger message is a message for requesting the at least one service or a message destined for the service provider network, and wherein the first conduit is removed when inactivity for a predetermined amount of time is detected.

4. The method of claim 1 comprising:
    at the first network node:
        learning a public Internet protocol (IP) address associated with the first site, wherein learning the public IP address includes receiving an encrypted packet via the first conduit, decrypting the encrypted packet using stored preshared keys associated with different sites until the encrypted packet is decrypted successfully, and identifying the public IP address from a decrypted packet header.

5. The method of claim 1 wherein conduit status information and time synchronization information associated with the first site is communicated via the first conduit using a representational state transfer application programming interface (REST API) and/or an encapsulation protocol.

6. The method of claim 1 wherein the first network node includes a gateway and a controller implemented using one or more virtual machines or virtual containers and wherein the first conduit utilizes multiple WAN links for reliability.

7. The method of claim 1 wherein the first conduit is associated with a first time manager implemented at the first network node or a node in the service provider network, wherein the first time manager is separate from a second time manager implemented at a network controller or a node in the first tenant's SD-WAN.

8. The method of claim 1 comprising:
    receiving, from the first tenant, second configuration information for configuring a third conduit for tunneling communications between the service provider network and a second site associated with the first tenant's SD-WAN;
    configuring, using the second configuration information, the third conduit for tunneling communications between the service provider network and the second site, wherein a combined bandwidth of the first conduit and the third conduit does not exceed the total bandwidth limit; and
    tunneling, via the third conduit, communications between the service provider network and the second site.

9. The method of claim 1 comprising:
    maintaining statistics associated with each conduit, site, and/or tenant.

10. A system for providing a multi-tenant software-defined wide area network (SD-WAN) node, the system comprising:
    a first network node in a service provider network for providing at least one service to multiple tenants, the first network node comprising:
    at least one processor; and
    a memory, wherein the first network node is configured for:
        generating, using input from an administrator of the service provider network, user configuration information for a first tenant, wherein the user configuration information includes a security key for allowing the first tenant to configure aspects of the first network node and a total bandwidth limit associated with the first tenant;
        sending, to the first tenant, at least some of the user configuration information;
        receiving, from the first tenant, first configuration information for configuring a first conduit for tunneling communications between the service provider network and a first site associated with the first tenant's SD-WAN;
        configuring, using the first configuration information, the first conduit for tunneling communications between the service provider network and the first site, wherein the first network node is associated with a plurality of conduits, wherein a second conduit of the plurality of conduits is at least in part configured by a second tenant and not the first tenant;

tunneling, via the first conduit, communications between the service provider network and the first site; and maintaining traffic monitoring information associated with each conduit, site, and/or tenant.

11. The system of claim 10 wherein the communications traversing the first conduit are encapsulated using a first set of protocol and/or encryption settings and wherein communications traversing the second conduit are encapsulated using a second set of protocol and/or encryption settings, wherein the first set of protocol and/or encryption settings is different from the second set of protocol and/or encryption settings.

12. The system of claim 10 wherein configuring the first conduit is in response to a trigger message, wherein the trigger message is a message for requesting the at least one service or a message destined for the service provider network, and wherein the first conduit is removed when inactivity for a predetermined amount of time is detected.

13. The system of claim 10 wherein the first network node is configured for learning a public Internet protocol (IP) address associated with the first site, wherein learning the public IP address includes receiving an encrypted packet via the first conduit, decrypting the encrypted packet using stored preshared keys associated with different sites until the encrypted packet is decrypted successfully, and identifying the public IP address from a decrypted packet header.

14. The system of claim 10 wherein conduit status information and time synchronization information associated with the first tenant is communicated via the first conduit using a representational state transfer application programming interface (REST API) and/or an encapsulation protocol.

15. The system of claim 10 wherein the first network node includes a gateway and a controller implemented using one or more virtual machines or virtual containers and wherein the first conduit utilizes multiple WAN links for reliability.

16. The system of claim 10 wherein the first conduit is associated with a first time manager implemented at the first network node or a node in the service provider network, wherein the first time manager is separate from a second time manager implemented at a network controller or a node in the first tenant's SD-WAN.

17. The system of claim 10 wherein the first network node is configured for:

receiving, from the first tenant, second configuration information for configuring a third conduit for tunneling communications between the service provider network and a second site associated with the first tenant's SD-WAN;

configuring, using the second configuration information, the third conduit for tunneling communications between the service provider network and the second site, wherein a combined bandwidth of the first conduit and the third conduit does not exceed the total bandwidth limit; and tunneling, via the third conduit, communications between the service provider network and the second site.

18. The system of claim 10 wherein the first network node is configured for maintaining statistics associated with each conduit, site, and/or tenant.

19. A non-transitory computer readable medium comprising computer executable instructions embodied in the non-transitory computer readable medium that when executed by at least one processor of at least one computer cause the at least one computer to perform steps comprising:

at a first network node in a service provider network for providing at least one service to multiple tenants:

generating, using input from an administrator of the service provider network, user configuration information for a first tenant, wherein the user configuration information includes a security key for allowing the first tenant to configure aspects of the first network node and a total bandwidth limit associated with the first tenant;

sending, to the first tenant, at least some of the user configuration information;

receiving, from the first tenant, first configuration information for configuring a first conduit for tunneling communications between the service provider network and a first site associated with the first tenant's SD-WAN;

configuring, using the first configuration information, the first conduit for tunneling communications between the service provider network and the first site, wherein the first network node is associated with a plurality of conduits, wherein a second conduit of the plurality of conduits is at least in part configured by a second tenant and not the first tenant;

tunneling, via the first conduit, communications between the service provider network and the first site; and maintaining traffic monitoring information associated with each conduit, site, and/or tenant.

20. The non-transitory computer readable medium of claim 19 wherein the communications traversing the first conduit are encapsulated using a first set of protocol and/or encryption settings and wherein communications traversing the second conduit are encapsulated using a second set of protocol and/or encryption settings, wherein the first set of protocol and/or encryption settings is different from the second set of protocol and/or encryption settings.

* * * * *